United States Patent
Heberger et al.

(12) 
(10) Patent No.: US 6,455,142 B1
(45) Date of Patent: Sep. 24, 2002

(54) ANTI-FOG COATING AND COATED FILM

(75) Inventors: John M. Heberger; Robin M. Donald, both of Greer; Jan C. Westermeier, Taylors; F. Gene Funderburk, Taylors; John G. Rollins, Taylors, all of SC (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 0 days.

(21) Appl. No.: 09/466,377

(22) Filed: Dec. 17, 1999

(51) Int. Cl.$^7$ .......................... B32B 27/06; B32B 27/08; B32B 27/18; B32B 27/36
(52) U.S. Cl. ..................... 428/215; 428/480; 428/482; 428/213; 428/216; 106/13; 528/293; 528/294; 528/295; 528/302; 528/308; 528/308.6; 528/308.7; 427/384; 427/385.5; 427/393.5
(58) Field of Search ................... 428/480, 482, 428/212, 213, 215, 216; 528/302, 308, 308.6, 308.7, 293, 294, 295; 106/13

(56) References Cited

U.S. PATENT DOCUMENTS

| | | |
|---|---|---|
| 4,467,073 A | 8/1984 | Creasy |
| 4,816,333 A | 3/1989 | Lange et al. |
| 4,847,324 A | 7/1989 | Creasy |
| 4,944,294 A | 7/1990 | Borek, Jr. |
| 4,987,182 A | 1/1991 | Creasy |
| 5,020,533 A | 6/1991 | Hubbard et al. |
| 5,334,457 A * | 8/1994 | Wada et al. ................ 428/480 |
| 5,496,647 A | 3/1996 | Krejci et al. |
| 5,512,211 A | 4/1996 | McSwigan et al. |
| 5,545,713 A | 8/1996 | Krejci et al. |
| 5,562,997 A | 10/1996 | Krejci et al. |
| 5,585,186 A | 12/1996 | Scholz et al. |
| 5,607,777 A | 3/1997 | Krejci et al. |
| 5,723,175 A | 3/1998 | Scholz et al. |
| 5,753,373 A | 5/1998 | Scholz et al. |
| 5,759,696 A * | 6/1998 | Alers ..................... 428/431 |
| 5,873,931 A | 2/1999 | Scholz et al. |
| 5,997,621 A | 12/1999 | Scholz et al. |
| 6,228,499 B1 * | 5/2001 | Nakauchi et al. ......... 428/412 |

FOREIGN PATENT DOCUMENTS

| | | |
|---|---|---|
| EP | 0 896 229 A2 | 2/1999 |
| EP | 0 899 315 A2 | 3/1999 |
| JP | 97/170325 | 6/1997 |
| JP | 97/202803 | 7/1997 |
| JP | 97/206102 | 7/1997 |
| JP | 97/260373 | 9/1997 |
| JP | 97/279012 | 10/1997 |
| WO | WO 95US15648 | 11/1995 |
| WO | WO 95/32237 | 11/1995 |
| WO | WO 96/18918 | 6/1996 |

OTHER PUBLICATIONS

Aerosol OT–NV product data sheet.

* cited by examiner

*Primary Examiner*—Vivian Chen

(57) ABSTRACT

The present invention provides a coated polymer film having an essentially streak-free coated surface that resists the formation of fog. The film includes a self-supporting polymer film layer, and an anti-fog coating on the film layer. The anti-fog coating, which can also be applied to alternate substrates, consisting essentially of a copolyester binder and an anionic surfactant, wherein the surfactant contains less than about 0.5 weight percent of a fluorosurfactant. A slip agent can also be included in the anti-fog coating.

36 Claims, No Drawings

ANTI-FOG COATING AND COATED FILM

BACKGROUND OF THE INVENTION

1. Field of the Invention

The present invention relates generally to a method for creating a fog resistant product, typically a polymer film, by means of coating the product with an anti-fog coating. The anti-fog coating is also disclosed.

2. Description of Related Art

Anti-fog coatings are desirable for many applications, such as facemasks and other types of face protection, eyewear such as goggles and glasses, car windshields, windows, bathroom mirrors, see-through packaging materials for moist foods and the like. Disposable and replaceable liners for eyewear such as welding goggles, ski goggles and the like, or for other surfaces subject to fogging, such as windows, are also a desired end use. In many of these applications, it is important that the coating be substantially transparent. However, prior art anti-fog coatings have suffered from numerous limitations, including high cost, need for frequent re-application, inadequate transparency and limited anti-fog properties. There is a need for anti-fog coatings that address one or more of these problems. There is similarly a need for anti-fog coatings that are suitable for use on disposable items such as single-use facemasks. A need also exists for anti-fog coatings that are adapted for application to polymer film substrates. In addition, prior art anti-fog coatings are typically applied off-line. This is a less efficient and more costly alternative. Coatings adapted for in-line application are also desirable.

BRIEF SUMMARY OF THE INVENTION

Accordingly, it is an object of the present invention to provide an anti-fog coating suitable for application to a base polymer film.

It is a further object of the present invention to provide a base polymer film with an anti-fog coating on one or both sides.

It is another object of the present invention to provide an anti-fog coating that is substantially free of streaks and smears, particularly when applied to a base polymer film.

It is yet another object of the present invention to provide an anti-fog coating that is substantially transparent.

The present invention has accomplished these objectives by providing in a preferred embodiment a coated polymer film having an essentially streak-free coated surface that resists the formation of fog. The film includes a self-supporting polymer film layer, and an anti-fog coating on the film layer. The anti-fog coating, which can also be applied to alternate substrates, includes a binder and a surfactant, where the surfactant preferably includes a fluorosurfactant at less than about 0.5 weight percent.

DETAILED DESCRIPTION OF THE INVENTION

The present inventors have surprisingly found that excellent anti-fog properties are provided by a coating that includes a copolyester binder and specific surfactants. The selection of binder and surfactants, and the specific amounts used of the preferred fluorosurfactant, have been found to be critical to the optimal anti-fog results achieved by various coatings of this invention.

The anti-fog coating of the present invention preferably includes a binder to anchor the anti-fog coating to the base polymer film. Polymeric binders have proven to be most effective. One preferred binder is a water soluble copolyester. Preferably, the water soluble copolyester includes a copolyester as disclosed in U.S. Pat. No. 4,493,872 to Funderburk et al., the disclosure of which is incorporated herein by reference in its entirety. This copolyester is disclosed as the condensation product of the following monomers or their polyester forming equivalents: isophthalic acid, a sulfomonomer containing an alkali metal sulfonate group attached to a dicarboxylic aromatic nucleus and an alkylene glycol with about 2 to about 11 carbon atoms. Optionally, an aliphatic dicarboxylic acid of the formula $HOOC(CH_2)$—$_n$$COOH$, where n is about 1 to about 11, can also be employed as a monomer therein. An optimal copolyester is made up of about 90 mol percent isophthalic acid, about 10 mol percent of the sodium salt of 5-sulfoisophthalic acid and about 100 mol percent ethylene glycol.

It is important to note, however, that the preferred percentage of sulfomonomer, isophthalic acid and aliphatic dicarboxylic acid employed is somewhat broader in the context of the present invention than in the Funderburk et al. patent. For example, in the context of the present invention, isophthalic acid is preferably about 50 to about 98 mol percent, aliphatic dicarboxylic acid is preferably about 0 to about 50 mol percent, and the sulfomonomer is preferably about 2 to about 20 mol percent. In addition, the sulfomonomer group of the present invention is not limited to an alkali metal sulfonate group. Any sulfomonomer in which a sulfonate group is attached to a dicarboxylic nucleus is preferred for use herein. In fact, any water soluble copolyester that functions to bind the coating to the surface of the base polymer film, either alone or synergistically in combination with other components, is preferred for use in the anti-fog coating of the present invention.

It is believed that films coated with an anti-fog film containing this binder would possess the improved adhesion to inks and metals that have been previously disclosed in conjunction with this class of compounds.

Another preferred water-soluble copolyester binder is a polymer having a Chemical Abstract Name of 1,3-benzenedicarboxylic acid, 5-sulfo-, 1,3-dimethyl ester, sodium salt, polymer with dimethyl 1,4-benzenedicarboxylate, 1,2-ethanediol and 2, 2'-oxybis [ethanol]. The molecular formula of this polymer is $(C_{10}H_{10}O_7S.C_{10}H_{10}O_4 \cdot C_4H_{10}O_3.C_2H_6O_2.Na)_x$. This copolyester is commercially available as AJ20A polymer from Palmetto Chemicals, Greenville, South Carolina, and contains an antimony catalyst. A similar polymer commercially available from the same company as AJ30 polymer is also preferred for use herein, but it contains a titanium catalyst. It is believed that the antimony catalyst of the AJ20A polymer is preferable because it minimizes the yellowness of reclaimed scrap film. The reclaim (no excessive yellowing or deterioration in physical properties when coated film scrap is mixed with fresh polymer and reextruded) and recycling characteristics of coated polymer film are important. The ability to reuse scrap film, instead of disposing of it, reduces material and waste disposal costs and minimizes unnecessary waste.

Without intending to be bound by theory, it is believed that water soluble and water dispersible binders are preferred for use in the present invention because this water sensitivity contributes to the positive antifog performance, particularly in combination with anionic surfactants. It is postulated that the surfactant induces wet out of the water droplets on the film surface, preventing fog, and the water sensitive binder absorbs the water, conducting it away from the surface. Water-based binders are also preferred for health and safety reasons, due the elimination or reduction of potentially hazardous solvents. In addition, is it believed that the preferred coating layers of the present invention are substantially amorphous, non-crystalline layers. They are preferably hydrophilic, water-wicking or water-dispersing layers.

Binders containing water-dispersing agents are preferred for use in the present invention. Agents having a sulfonated component are particularly useful. Such water-dispersing agents include 5-sulfoisophthalic acid (also known as 5-SIPA), or its 1,3-dimethyl ester sodium salt. Alternate sulfomonomers disclosed in U.S. Pat. No. 5,496,647 to Krejci et al., the disclosure of which is incorporated herein by reference, are also preferred for use herein.

The binder is preferably present at about 1 to about 30 percent by weight of the coating solution, and in an alternate preferred embodiment, it is present at about 1 to about 6 percent by weight of the coating solution.

It is also preferred that the anti-fog coating of the present invention include a surfactant or mixture of surfactants. In one preferred embodiment, the anti-fog coating contains an anionic surfactant. The anionic surfactant results in a high wetting tension on the surface of the dried coating, and the high wetting tension prevents the formation of minute water droplets—fog—on the film surface. The anionic surfactant further enhances the wet-out of the water to maintain a clear, non-fogged surface. A preferred anionic surfactant for use in the anti-fog coatings of the present invention is sodium dodecyl benzenesulfonate. This surfactant is commercially available as Rhodacal LDS-10 surfactant from Rhone Poulenc. In an alternate preferred embodiment, a fluorosurfactant is included in the anti-fog coating of the present invention. Preferably, this fluorosurfactant contains fluoroaliphatic oxyethylenes of carbon chain lengths of about 4 to about 8, and it can also include polyethylene glycol. Such a flurosurfactant is commercially available from 3M as Fluorad FC-170C surfactant. The fluorosurfactant, among other things, serves to minimize streaking of the coating. This effect is shown clearly when the coating is applied to a polymer film surface. This is particularly important for anti-fog coatings that are applied to clear films for applications such as window films and face shields, where visibility should not be limited by streaks or smears. The fluorosurfactant works optimally in combination with the anionic surfactant because it minimizes or eliminates the coating streaks that can be caused by the anionic surfactant.

Alternate surfactants that are preferred for use in the present invention include sodium lauryl sulfate, an anionic surfactant commercially available as Sipon UB, and a sulfosuccinate blend, an anionic surfactant commercially available as Aerosol OTNV. While this blend is proprietary, it is indicated to be covered by U.S. Pat. No. 5,512,211, the disclosure of which is incorporated herein by reference. A similar surfactant, Aerosol TO, is also commercially available from Cytec Industries, and is a sodium dioctyl sulfosuccinate. The anionic surfactant sodium 2-ethylhexyl sulfate, commercially available as Rhodapon BOS, is also preferred for use herein.

The surfactant component is preferably present at about 0.4 to about 2.0 weight percent of the anti-fog coating composition. Higher levels can be used, however they typically result in an increase in haze, which is undesirable for many applications. In an alternate preferred embodiment, the surfactant component makes up about 0.8 to about 1.5 weight percent of the coating. It has been surprisingly found that the fluorosurfactant provides optimal results when present at no more than about 0.5 weight percent of the coating. A range of about 0.001 to about 0.5 weight percent is preferred, with a range of about 0.01 to about 0.10 being alternately preferred. In an alternate embodiment, the preferred content is about 0.05 weight percent fluorosurfactant of the coating. At significantly higher amounts of fluorosurfactant, the anti-fog properties of the coating and coated film show markedly lower performance.

The ingredients of the anti-fog coating are preferably formulated as a dispersion in water or a water-containing solvent. Alternatively, alcohols or other suitable organic solvents can be employed, alone or in combination with water. The solids level is preferably up to about 50 weight percent, alternatively about 0.01 to about 30 weight percent, more preferably about 1 to about 6 weight percent.

In addition, a slip agent is preferably incorporated into the anti-fog coating of the present invention. The slip agent is believed to enhance the ability of the coated film to wind smoothly during the manufacturing process. The slip agent is preferably inorganic. More preferably, the slip agent includes colloidal $SiO_2$, most preferably the product commercially available as Nalco 1060® colloidal $SiO_2$ from the Nalco Chemical Company. Other slip agents that are preferred for use in the present invention include silica in one or more of its various morphological forms, including those commercially available as Syloid ® silica or Rapidup ® silica, although due to their larger particle size, they are less preferred for uses in which clarity and low haze are needed. Moreover, a combination of two or more of the foregoing slip agents is also preferred for use. The slip agent is preferably present at about 0.25 to about 2 weight percent of the anti-fog coating. In an alternate preferred embodiment, the slip agent is present at about 0.3 to about 1.0 weight percent, or in a third preferred embodiment at about 0.5 weight percent.

Conventional additives that are known in the art can be included in the anti-fog coatings of the present invention. For example, pigments, other colorants, stabilizers, antistatic agents, adhesion promoters, antioxidants, delusterants, fillers, plasticizers and the like can be included in the anti-fog coatings of the present invention.

The preferred solids level of the anti-fog coating, as it is applied to the base polymer film, is a level sufficient to yield a final dry coating thickness within the range of about 0.02 microns to about 0.1 microns, alternatively about 0.03 microns to about 0.05 microns. In addition, the anti-fog coating of the present invention is suitable for application at much higher levels, and for extrusion or coextrusion as a separate self-supporting web.

The coating compositions of the present invention can be formulated by simply combining the desired coating components. Agitation may be used to insure an even dispersion or solution.

Base Film

For many preferred uses of the coating and method of the present invention, a polymer film substrate is most useful. It provides a lightweight, substantially transparent, inexpensive, disposable or recyclable substrate that accommodates many of the end uses of fog resistant materials. In addition, the coated polymer film can also easily be laminated by heat bonding or by adhesives to various other substrates.

The anti-fog coatings and coating methods of the present invention are applicable to any polymeric film capable of acting as a substrate for an anti-fog coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Alternate Substrates

As discussed above, the coatings and methods of reducing fog of the present invention are not limited to use on polymer film bases. Alternate substrates such as metals, glass, polymeric articles and the like can be coated according to the teachings of the present invention. Furthermore, it is envisioned that polymer films coated with the coatings of the present invention can also be applied to other surfaces, including irregular surfaces, to provide anti-fog properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Pat. No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the anti-fog coating In light of the foregoing, a preferred method of controlling fog formation on polymer film is provided herein. Preferably, one or both faces of a base polymer film are coated with an anti-fog coating of the present invention. Optionally, if only one face is coated with the anti-fog coating of the present invention, this coating can occur before, after or at the same time the opposite face of the base polymer film is coated with an alternate coating. The anti-fog coating is preferably not overcoated with another coating. Such a top coating could limit the ability of the anti-fog coating to prevent fog.

EXAMPLES

The following Examples demonstrate various aspects of certain preferred embodiments of the present invention, and are not to be construed as limitations thereof. The formulations of the individual samples are shown in the charts below. In each example, the listed coating samples were formulated and coated in-line on biaxially oriented polyester film. Specifically, heat set PET film was coated in-line between draw steps on biaxially oriented polyester film with the following sample coatings. As in all of the following examples, anti-fog performance was tested by placing a sheet of the coated film, coated side down, over a warm air humidifier such as a "Holmes Air Pure Mist" humidifier at a distance of approximately 3 to 6 inches for a period of approximately 2 seconds. The sheets were observed for fogging, with a score of 1 being completely obscured by fog and 5 being fog-free. The wetting tension of the film surface is measured using the Victor Contact Angle System of AST Products, Billerica, Mass.

EXAMPLE SERIES A

| Ex. | Coating Formulation | Anti-fog | Wetting Tension (dynes/cm) |
|---|---|---|---|
| A-1 | 12.5% AJ-30 + 0.5% Nalco 1060 | 1 | 51.00 |
| A-2 | 13.5% AJ-30 + 0.5% Nalco 1060 | 1 | 52.16 |

-continued

| Ex. | Coating Formulation | Anti-fog | Wetting Tension (dynes/cm) |
|---|---|---|---|
| A-3 | 12.8% AJ-30 + 0.5% Nalco 1060 + 0.7% Cymel 303 | 1 | 51.56 |
| A-4 | 14.5% AJ-30 + 0.5% Nalco 1060 | 1 | 52.31 |
| A-5 | 12.5% AJ-30 + 0.5% Nalco 1060 + 1% LDS-10 | 5 | 69.97 |
| A-6 | 12.5% AJ-30 + 0.5% Nalco 1060 + 1% LDS-10 | 5 | 69.71 |
| A-7 | 12.5% AJ-30 + 0.5% Nalco 1060 + 1% FC-170C | 3.5 | 48.25 |
| A-8 | 12.5% AJ-30 + 0.5% Nalco 1060 + 1% Airvol 107 PVOH | 2 | 54.25 |

Cymel 303 is a melamine hardener/crosslinker
Airvol 107 PVOH is polyvinyl alcohol.

The first series of examples demonstrate the improved performance provided by the LDS-10 surfactant. As seen in examples A-5 and A-6, the combination of copolyester and this anionic surfactant provide surprisingly superior anti-fog performance. The presence of crosslinkers and polyvinyl alcohol (A-3 and A-8) do not give rise to such performance. Example A-7 demonstrates that the fluorosurfactant alone provides acceptable but not excellent anti-fog properties, suggesting a synergistic effect of the fluorosurfactant with surfactants such as LDS-10. These data also support a direct correlation between wetting tension and anti-fog performance. It is further shown that a wetting tension of about 60 dynes/cm or greater (optionally to about 72 dynes/cm or more) is preferred herein. As will be shown in the following examples, wetting tension of greater than 65 dynes/cm is alternately preferred, with wetting tension of greater than 69 being an additional preferred embodiment.

Example Series B

The potential negative effect of Cymel 303 crosslinker melamine hardener and more than 0.1% FC 170C is supported by the following examples, in which levels of AJ-30 copolymer, LDS-10 surfactant, Nalco 1060 silica, and FC-170C fluorosurfactant are varied:

| Ex. | Coating Formulation | Anti-fog (fresh/aged) | Wetting Tension (dynes/cm) |
|---|---|---|---|
| B-1 | 25% AJ-30 + 1% LDS-10 + 0.5% Nalco 1060 | 5/5 | 68.50 |
| B-2 | 25% AJ-30 + 1% LDS-10 + 0.5% Nalco 1060 | 5/5 | 66.70 |
| B-3 | 25% AJ-30 + 1% LDS-10 + 0.5% Nalco 1060 | —/3 | 69.02 |
| B-4 | 22.5% AJ-30 + 1% LDS-10 + 0.5% Nalco 1060 | 5/5 | 69.17 |
| B-5 | 22.5% AJ-30 + 1% LDS-10 + 0.5% Nalco 1060 | 5/4 | 70.18 |
| B-6 | 22.5% AJ-30 + 1% LDS-10 + 0.5% Nalco 1060 | 5/5 | 69.95 |
| B-7 | 20% AJ-30 + 1% LDS-10 + 0.5% Nalco 1060 | 4/3 | 65.44 |
| B-8 | 20% AJ-30 + 1% LDS-10 + 0.5% Nalco 1060 | 4/5 | 66.07 |
| B-9 | 20% AJ-30 + 1% LDS-10 + 0.5% Nalco 1060 | 4/4 | 65.13 |
| B-10 | 22.5% AJ-30 + 1% LDS-10 + 0.1% FC-170C + 0.5% Nalco 1060 | 4.5/5 | 66.75 |
| B-11 | 22.5% AJ-30 + 1% LDS-10 + 0.25% FC-170C + 0.5% Nalco 1060 | 3/5 | 69.22 |
| B-12 | 22.5% AJ-30 + 1% LDS-10 + 0.5% FC-170C + 0.5% Nalco 1060 | 1/5 | 68.977 |
| B-13 | 22.5% AJ-30 + 1% LDS-10 + 0.25% FC-170C + 2.2% Cymel 303 + 0.5% Nalco 1060 | 1/2 | 58.10 |
| B-14 | 22.5% AJ-30 + 1% LDS-10 + 0.25% FC-170C + 1.1% Cymel 303 + 0.5% Nalco 1060 | 1/3 | 63.68 |
| B-15 | 22.5% AJ-30 + 1% LDS-10 + 0.25% FC-170C + 0.5% Cymel 303 + 0.5% Nalco 1060 | 3/5 | 64.92 |
| B-16 | 10% M + 1% LDS-10 +0.5% Nalco 1060 | 4/3 | 70.71 |
| B-17 | 10% M + 1% LDS-10 + 0.25% FC-170C + 0.5% Nalco 1060 | 1/4.5 | 70.73 |
| B-18 | 10% M + 1% LDS-10 + .25% FC-170C + 1% Cymel 303 + 0.5% Nalco 1060 | 1/4.5 | 66.91 |
| B-19 | 10% M + 1% LDS-10 + 0.25 FC-170C + 0.5% Cymel 303 + 0.5% Nalco 1060 | 3/4.5 | 68.78 |
| B-20 | 10% M + 1% LDS-10 + 0.25 FC-170C + 0.25% Cymel 303 + 0.5% Nalco 1060 | 3/4.5 | 69.93 |

M = a copolyester of 10 mol percent sodium salt of 5-sulfoisophthalic acid, 90 mol percent isophthalic acid and 100 mol percent ethylene glycol
Fresh = day of manufacture
Aged = 22 days after manufacture This Example demonstrates the ameliorative effect of short-term aging on some compositions according to the present invention (B-11 and following, except B-16). In addition, it suggests that at fluorosurfactant levels of 0.5 or greater (B-12), or when crosslinkers are added (B-13 through B-15 and B-18 through B-20) anti-fog performance is diminished, particularly for fresh film.

Example Series C

These examples reinforce the conclusion that the use of greater than 1% LDS-10 surfactant gives rise to improved performance:

| Ex. | Coating Formulation | Anti-fog (fresh/aged) | Wetting Tension (dynes/cm) |
|---|---|---|---|
| C-1 | 15% AJ-30 + 1% LDS-10 + 0.5% Nalco 1060 | 5/5 | 70.38 |
| C-2 | 25% AJ-30 + 1% LDS-10 + 0.5% Nalco 1060 | 5/5 | 70.09 |
| C-3 | 15% AJ-30 + 2% LDS-10 + 0.5% Nalco 1060 | 5/5 | 70.71 |
| C-4 | 25% AJ-30 + 2% LDS-10 + 0.5% Nalco 1060 | 5/5 | 70.04 |
| C-5 | 15% AJ-30 + 1% LDS-10 + 1% Nalco 1060 | 5/5 | 70.35 |
| C-6 | 25% AJ-30 + 1% LDS-10 + 1% Nalco 1060 | 5/5 | 68.28 |
| C-7 | 15% AJ-30 + 2% LDS-10 + 1% Nalco 1060 | 5/5 | 69.76 |
| C-8 | 25% AJ-30 + 2% LDS-10 + 1% Nalco 1060 | 5/5 | 70.28 |
| C-9 | 25% AJ-30 + 2% LDS-10 + 0.1% Nalco 1060 | 5/5 | 70.14 |
| C-10 | 7.5% AJ-30 + 0.5% LDS-10 + 0.5% Nalco 1060 | 1/3 | 67.25 |
| C-11 | 15% AJ-30 + 0.5% LDS-10 + 0.5% Nalco 1060 | 3/4.5 | 65.47 |
| C-12 | 7.5% AJ-30 + 1% LDS-10 + 0.5% Nalco 1060 | 5/4 | 69.54 |
| C-13 | 15% M-30 + 1% LDS-10 + 0.5% Nalco 1060 | 5/5 | 69.70 |
| C-14 | 7.5% AJ-30 + 0.5% LDS-10 + 1% Nalco 1060 | 1/3 | 64.03 |
| C-15 | 15% AJ-30 + 0.5% LDS-10 + 1% Nalco 1060 | 1/3 | 64.31 |
| C-16 | 7.5% AJ-30 + 1% LDS-10 + 1% Nalco 1060 | 5/5 | 70.53 |
| C-17 | 15% AJ-30 + 1% LDS-10 + 1% Nalco 1060 | —/— | 64.47 |
| C-18 | 15% AJ-30 + 1% LDS-10 + 1% Nalco 1060 | 5/5 | 68.66 |
| C-19 | 15% AJ-30 + 1% LDS-10 + 0.5% Nalco 1060 + 0.01% FC-170C | 5/4.5 | 68.74 |
| C-20 | 15% AJ-30 + 1% LDS-10 +0.5% Nalco 1060 + 0.02% FC-170C | 5/5 | 68.82 |
| C-21 | 15% AJ-30 + 1% LDS-10 + 0.5% Nalco 1060 + 0.05% FC-170C | 5/5 | 68.04 |
| C-22 | 15% AJ-30 + 1% LDS-10 + 0.5% Nalco 1060 + 0.1% FC-170C | 5/5 | 67.56 |

The optimal results, with high anti-fog performance, are achieved with films having higher levels of surfactant, namely 2 weight percent of total composition. Notably, too, these results are achieved with a lower relative copolyester content of about 15 percent. These examples (notably C-10, C-14 and C-15, in comparison with surrounding examples) suggest that low levels of copolyester (approximately 7.5% and 15%) in combination with low levels of LDS-10 surfactant (0.5%) give rise to poorer results.

Example Series D

| Ex. | Coating Formulation | Anti-fog | Wetting Tension (dynes/cm) | Total Haze (%) | Transmission (%) |
|---|---|---|---|---|---|
| D-1 | 1% AJ-30 + 1% LDS-10 + 0.05% FC-170C + 0.5% Nalco 1060 | 4 | 65.95 | 0.68 | 89.6 |
| D-2 | 2% AJ-30 + 1% LDS-10 + 0.05% FC-170C + 0.5% Nalco 1060 | 4 | 69.30 | 0.62 | 89.8 |
| D-3 | 3% AJ-30 + 1% LDS-10 + 0.05% FC-170C + 0.5% Nalco 1060 | 3 | 68.94 | 0.65 | 90.5 |
| D-4 | 4% AJ-30 + 1% LDS-10 + 0.05% FC-170C + 0.5% Nalco 1060 | 4.5 | 69.77 | 0.75 | 90.6 |
| D-5 | 5% AJ-30 + 1% LDS-10 + 0.05% FC-170C + 0.5% Nalco 1060 | 4.5 | 69.43 | 0.80 | 90.8 |
| D-6 | 6% AJ-30 + 1% LDS-10 + 0.05% FC-170C + 0.5% Nalco 1060 | 5 | 69.51 | 0.97 | 90.7 |
| D-7 | 7% AJ-30 + 1% LDS-10 + 0.05% FC-170C + 0.5% Nalco 1060 | 5 | 69.65 | 0.80 | 91.2 |
| D-8 | 8% AJ-30 + 1% LDS-10 + 0.05% FC-170C + 0.5% Nalco 1060 | 5 | 67.81 | 0.82 | 91.0 |
| D-9 | 9% AJ-30 + 1% LDS-10 + 0.05% FC-170C + 0.5% Nalco 1060 | 5 | 69.65 | 0.84 | 91.1 |
| D-10 | 10% AJ-30 + 1% LDS-10 + 0.05% FC-170C + 0.5% Nalco 1060 | 4.5 | 69.59 | 0.81 | 91.4 |
| D-11 | 1% AJ-20A + 1% LDS-10 + 0.05% FC-170C + 0.5% Nalco 1060 | 4 | 69.94 | 0.70 | 90.1 |
| D-12 | 2% AJ-20A + 1% LDS-10 + 0.05% FC-170C + 0.5% Nalco 1060 | 3.5 | 69.48 | 0.74 | 90.2 |
| D-13 | 3% AJ-20A + 1% LDS-10 + 0.05% FC-170C + 0.5% Nalco 1060 | 4 | 69.94 | 0.86 | 90.3 |
| D-14 | 4% AJ-20A + 1% LDS-10 + 0.05% FC-170C + 0.5% Nalco 1060 | 5 | 69.64 | 0.92 | 90.5 |
| D-15 | 5% AJ-20A + 1% LDS-10 + 0.05% FC-170C + 0.5% Nalco 1060 | 5 | 69.74 | 0.82 | 91.2 |

-continued

| Ex. | Coating Formulation | Anti-fog | Wetting Tension (dynes/cm) | Total Haze (%) | Transmission (%) |
|---|---|---|---|---|---|
| D-16 | 6% AJ-20A + 1% LDS-10 + 0.05% FC-170C + 0.5% Nalco 1060 | 5 | 69.96 | 1.50 | 91.2 |
| D-17 | 7% AJ-20A + 1% LDS-10 + 0.05% FC-170C + 0.5% Nalco 1060 | 5 | 69.67 | 0.78 | 91.4 |
| D-18 | 8% AJ-20A + 1% LDS-10 + 0.05% FC-170C + 0.5% Nalco 1060 | 5 | 69.41 | 0.75 | 91.0 |
| D-19 | 9% AJ-20A + 1% LDS-10 + 0.05% FC-170C + 0.5% Nalco 1060 | 5 | 70.30 | 0.66 | 91.8 |
| D-20 | 10% AJ-20A + 1% LDS-10 + 0.05% FC-170C + 0.5% Nalco 1060 | 5 | 69.17 | 0.75 | 91.5 |

These results establish that even relatively low levels of copolyester binder give acceptable anti-fog performance in combination with low levels of surfactants, but that even better performance is achieved at higher levels of copolyester binder.

Total haze is a preferred method of measuring the clarity of a polyester film, which can determine its suitability for such films as antifog faceshield film. Haze is measured based on ASTM Method D1003-61, Procedure A, "Haze and Luminous Transmittance of Transparent Plastics", using a BYK Gardner "Haze Gard Plus" instrument. The AJ-20A provides minimum haze at higher concentrations, whereas the AJ-30 provides minimum haze at lower concentrations.

Example Series E

These examples establish that two different preferred copolyester binders perform better at higher levels of LDS-10 surfactant.

| Ex. | Coating Formulation | Anti-fog | Wetting Tension (dynes/cm) | Total Haze (%) | Transmission (%) |
|---|---|---|---|---|---|
| E-1 | 6% AJ-20A + 0.5% LDS-10 + 0.05% FC-170C + 0.5% Nalco 1060 | 2 | 66.14 | 0.87 | 90.3 |
| E-2 | 6% AJ-20A + 0.75% LDS-10 + 0.05% FC-170C + 0.5% Nalco 1060 | 4 | 69.99 | 1.08 | 90.2 |
| E-3 | 6% AJ-20A + 1% LDS-10 + 0.05% FC-170C + 0.5% Nalco 1060 | 5 | 68.82 | 1.21 | 90.4 |
| E-4 | 6% AJ-20A + 1.25% LDS-10 + 0.05% FC-170C + 0.5% Nalco 1060 | 5 | 70.34 | 1.14 | 90.3 |
| E-5 | 6% AJ-20A + 1.5% LDS-10 + 0.05% FC-170C + 0.5% Nalco 1060 | 5 | 68.98 | 1.34 | 90.7 |
| E-6 | 6% AJ-20A + 2% LDS-10 + 0.05% FC-170C + 0.5% Nalco 1060 | 5 | 69.24 | 1.62 | 90.4 |
| E-7 | 6% AJ-20A + 1% LDS-10 + 0.05% FC-170C + 0.03% Cymel 303 + 0.5% Nalco 1060 | 5 | 70.10 | 0.91 | 91.2 |
| E-8 | 6% AJ-20A + 1% LDS-10 + 0.05% FC-170C + 0.03% Cymel 303 + 0.5% Nalco 1060 | 5 | 70.32 | 1.08 | 91.0 |
| E-9 | 6% AJ-20A + 1% LDS-10 + 0.05% FC-170C + 0.03% Cymel 303 + 0.5% Nalco 1060 | 5 | 70.14 | 1.02 | 90.3 |
| E-10 | 6% M + 0.5% LDS-10 + 0.05% FC-170C + 0.5% Nalco 1060 | 1 | 66.13 | 0.59 | 90.7 |
| E-11 | 6% M + 0.75% LDS-10 + 0.05% FC-170C + 0.5% Nalco 1060 | 3 | 70.68 | 0.72 | 91.3 |
| E-12 | 6% M + 0.5% LDS-10 + 0.05% FC-170C + 0.5% Nalco 1060 | 4 | 70.96 | 0.74 | 91.3 |
| E-13 | 6% M + 1.25% LDS-10 + 0.05% FC-170C + 0.5% Nalco 1060 | 5 | 71.18 | 082 | 91.2 |
| E-14 | 6% M + 1.5% LDS-10 + 0.05% FC-170C + 0.5% Nalco 1060 | 5 | 70.87 | 0.88 | 91.0 |
| E-15 | 6% M + 2% LDS-10 + 0.05% FC-170C + 0.5% Nalco 1060 | 5 | 70.77 | 0.99 | 91.2 |

Coatings containing less than 0.75%, specifically 0.5% LDS-10, show poor anti-fog performance. Even at 0.75% LDS-10 surfactant, the resulting anti-fog effects are not complete. In this case, at optimized coating formulations, the presence of the Cymel 303 crosslinker did not adversely affect performance (see E-7 through E-9) and its presence is believed to provide greater permanence to the coating. Total haze increases generally for each system as the level of LDS-10 surfactant increases.

Example Series F

| Ex. | Coating Formulation | Anti-fog | Wetting Tension (dynes/cm) | Total Haze (%) | Transmission (%) |
|---|---|---|---|---|---|
| F-1 | 6% AJ-20A + 1% Rhodacal LDS-10 + 0.05% FC-170C + 0.5% Nalco 1060 | 5 | 70.07 | 1.38 | 90.7 |
| F-2 | 6% AJ-20A + 1.5% Rhodacal LDS-10 + 0.05% FC-170C + 0.5% Nalco 1060 | 5 | 70.86 | 1.47 | 90.8 |
| F-3 | 6% AJ-20A + 1% Sipon UB + 0.05% FC-170C + 0.5% Nalco 1060 | 5 | 70.59 | 0.74 | 90.0 |
| F-4 | 6% AJ-20A + 1.5% Sipon UB + 0.05% FC-170C + 0.5% Nalco 1060 | 5 | 71.29 | 0.97 | 90.6 |
| F-5 | 6% AJ-20A + 1% Aerosol OTNV + 0.05% FC-170C + 0.5% Nalco 1060 | 5 | 71.07 | 0.75 | 90.5 |
| F-6 | 6% AJ-20A + 1.5% Aerosol OTNV + 0.05% FC-170C + 0.5% Nalco 1060 | 5 | 69.78 | 1.45 | 90.6 |
| F-7 | 6% M + 1% Rhodacal LDS-10 + 0.05% FC-170C + 0.5% Nalco 1060 | 5 | 70.60 | 0.94 | 89.6 |
| F-8 | 6% AJ-20A + 1.5% Rhodacal LDS-10 + 0.05% FC-170C + 0.5% Nalco 1060 | 5 | 70.64 | 1.23 | 90.0 |
| F-9 | 6% M + 1% Sipon UB + 0.05% FC-170C + 0.5% Nalco 1060 | 5 | 70.92 | 1.01 | 90.1 |
| F-10 | 6% M + 1.5% Sipon UB + 0.05% FC-170C + 0.5% Nalco 1060 | 5 | 70.70 | 1.29 | 90.4 |
| F-11 | 6% M + 1% Aerosol OTNV + 0.05% FC-170C + 0.5% Nalco 1060 | 5 | 70.97 | 0.93 | 90.0 |
| F-12 | 6% M + 1.5% Aerosol OTNV + 0.05% FC-170C + 0.5% Nalco 1060 | 5 | 70.64 | 1.33 | 90.1 |

The foregoing preferred compositions show that optimal results can be achieved with varying levels and varying components according to the present invention. It is noted that haze rises to a degree when the level of surfactant is raised.

Example Series G

| Ex. | Coating Formulation | Anti-fog | Wetting Tension (dynes/cm) | Total Haze (%) | Transmission (%) |
|---|---|---|---|---|---|
| G-1 | 4% AJ-20A + 0.48% Aerosol OTNV + 0.05% FC-170C + 0.5% Nalco 1060 | 3 | 67.91 | 0.77 | 90.7 |
| G-2 | 4% AJ-20A + 0.72% Aerosol OTNV + 0.05% FC-170C + 0.5% Nalco 1060 | 5 | 70.35 | 0.80 | 90.3 |
| G-3 | 4% AJ-20A + 0.96% Aerosol OTNV + 0.05% FC-170C + 0.5% Nalco 1060 | 5 | 70.88 | 0.89 | 90.3 |
| G-4 | 4% AJ-20A + 1.2% Aerosol OTNV + 0.05% FC-170C + 0.5% Nalco 1060 | 5 | 70.55 | 0.84 | 90.3 |
| G-5 | 6% AJ-20A + 0.48% Aerosol OTNV + 0.05% FC-170C + 0.5% Nalco 1060 | 4 | 69.75 | 0.69 | 90.6 |
| G-6 | 6% AJ-20A + 0.72% Aerosol OTNV + 0.05% FC-170C + 0.5% Nalco 1060 | 5 | 70.73 | 0.67 | 90.7 |
| G-7 | 6% AJ-20A + 0.96% Aerosol OTNV + 0.05% FC-170C + 0.5% Nalco 1060 | 5 | 71.16 | 0.65 | 90.3 |
| G-8 | 6% AJ-20A + 1.2% Aerosol OTNV + 0.05% FC-170C + 05% Nalco 1060 | 5 | 70.88 | 0.75 | 91.2 |

Aerosol OTNV provides excellent antifog performance and excellent clarity. Total haze is low throughout the ranges shown.

Example Series H

| Ex. | Coating Formulation | Anti-fog | Wetting Tension (dynes/cm) | Total Haze (%) | Transmission (%) |
|---|---|---|---|---|---|
| H-1 | 2% AJ-20A + 0.4% Aerosol OTNV + 0.05% FC-170C + 0.5% Nalco 1060 | 4 | 69.38 | 0.49 | 90.9 |
| H-2 | 2% AJ-20A + 0.6% Aerosol OTNV + 0.05% FC-170C + 0.5% Nalco 1060 | 5 | 69.51 | 0.60 | 89.9 |
| H-3 | 2% AJ-20A + 0.8% Aerosol OTNV + 0.05% FC-170C + 0.5% Nalco 1060 | 5 | 69.67 | 0.56 | 90.1 |
| H-4 | 2% AJ-20A + 1% Aerosol OTNV + 0.05% FC-170C + 0.5% Nalco 1060 | 5 | 70.57 | 0.68 | 90.4 |
| H-5 | 3% AJ-20A + 0.4% Aerosol OTNV + 0.05% FC-170C + 0.5% Nalco l060 | 4 | 66.51 | 0.73 | 90.2 |
| H-6 | 3% AJ-20A + 0.6% Aerosol OTNV + 0.05% FC-170C + 0.5% Nalco 1060 | 4 | 70.56 | 0.77 | 90.3 |
| H-7 | 3% AJ-20A +0.8% Aerosol OTNV + 0.05% FC-170C + 0.5% Nalco 1060 | 5 | 70.61 | 0.83 | 89.8 |
| H-8 | 3% AJ-20A + 1% Aerosol OTNV + 0.05% FC-170C + 0.5% Nalco 1060 | 5 | 69.83 | 0.94 | 90.4 |
| H-9 | 4% AJ-20A + 0.4% Aerosol OTNV + 0.05% FC-170C + 0.5% Nalco 1060 | 4 | 66.57 | 0.82 | 90.6 |
| H-10 | 4% M-20A + 0.6% Aerosol OTNV + 0.05% FC-170C + 0.5% Nalco 1060 | 5 | 70.04 | 0.83 | 90.2 |
| H-11 | 4% AJ-20A + 0.8% Aerosol OTNV + 0.05% FC-170C + 0.5% Nalco 1060 | 5 | 70.39 | 0.89 | 90.3 |
| H-12 | 4% AJ-20A + 1% Aerosol OTNV + 0.05% FC-170C + 0.5% Nalco 1060 | 5 | 70.82 | 0.86 | 91.0 |
| H-13 | 2% AJ-20A + 0.4% Sipon UB + 0.05% FC-170C + 0.5% Nalco 1060 | 2 | 55.39 | 0.63 | 90.7 |
| H-14 | 2% AJ-20A + 0.6% Sipon UB + 0.05% FC-170C + 0.5% Nalco 1060 | 3 | 62.86 | 0.66 | 90.7 |
| H-15 | 2% AJ-20A + 0.8% Sipon UB + 0.05% FC-170C + 0.5% Nalco 1060 | 4 | 66.76 | 0.66 | 90.7 |
| H-16 | 2% AJ-20A + 1% Sipon UB + 0.05% FC-170C + 0.5% Nalco 1060 | 4 | 67.67 | 0.71 | 91.1 |
| H-17 | 3% AJ-20A + 0.4% Sipon UB + 0.05% FC-170C + 0.5% Nalco 1060 | 2 | 54.57 | 0.66 | 90.6 |
| H-18 | 3% AJ-20A + 0.6% Sipon UB + 0.05% FC-170C + 0.5% Nalco 1060 | 3 | 61.96 | 0.71 | 91.0 |
| H-19 | 3% AJ-20A + 0.8% Sipon UB + 0.05% FC-170C + 0.5% Nalco 1060 | 4 | 66.85 | 0.78 | 90.7 |
| H-20 | 3% AJ-20A + 1% Sipon UB + 0.05% FC-170C + 0.5% Nalco 1060 | 4 | 66.82 | 0.76 | 91.3 |
| H-21 | 4% AJ-20A + 0.4% Sipon UB + 0.05% FC-170C + 0.5% Nalco 1060 | 2 | 55.87 | 0.69 | 90.8 |
| H-22 | 4% AJ-20A + 0.6% Sipon UB + 0.05% FC-170C + 0.5% Nalco 1060 | 3 | 61.79 | 0.87 | 90.8 |
| H-23 | 4% AJ-20A + 0.8% Sipon UB + 0.05% FC-170C + 0.5% Nalco 1060 | 4 | 68.32 | 0.70 | 91.0 |

These data suggest that Sipon UB surfactant is preferably used at a somewhat higher level than Aerosol OTNV surfactant, with roughly 0.8% and 0.4% preferred minimums, respectively.

The present invention having been thus described with particular reference to the preferred forms and embodiments thereof, it will be obvious to one of ordinary skill in the art that various changes and modifications may be made therein without departing from the spirit and scope of the invention as defined in the appended claims.

What is claimed is:

1. A coated polymer film having a coated surface that resists the formation of fog, said film comprising
    a self-supporting polymer film layer, and
    an anti-fog coating on said film layer, said anti-fog coating consisting essentially of a hydrophilic copolyester binder and a surfactant, wherein said surfactant contains less than about 0.5 weight percent of a fluorosurfactant, and wherein said coating has a wetting tension of greater than about 60 dynes/cm.

2. The coated polymer film of claim 1, wherein said anti-fog coating is transparent.

3. The coated polymer film of claim 1, wherein said film is transparent.

4. The coated polymer film of claim 1, wherein an intermediate coating or layer is interposed between said anti-fog coating and said film layer.

5. The coated polymer film of claim 1, wherein said fluorosurfactant comprises fluoroaliphatic oxyethylenes of carbon chain lengths of about 4 to about 8 and polyethylene glycol.

6. The coated polymer film of claim 1, wherein said binder comprises a water-soluble copolyester comprising, 1,3-benzenedicarboxylic acid, 5-sulfo-, 1,3-dimethyl ester sodium salt, polymer and dimethyl 1,4-benzenedicarboxylate, 1,2-ethanediol and 2,2'-oxybis (ethanol).

7. The coated polymer film of claim 1, wherein said binder comprises a water-soluble copolyester comprising about 50 to about 98 mol percent isophthalic acid, about 2 to about 20 mol percent of at least one sulfomonomer containing a sulfonate group attached to a dicarboxylic nucleus, and about 100 mol percent of at least one copolymerizable glycol having from about 2 to about 11 carbon atoms.

8. The polymer film of claim 1, wherein said polymer comprises polyester.

9. The polymer film of claim 1, wherein said binder is present at about 1 to about 30 weight percent of said anti-fog coating.

10. The polymer film of claim 1, wherein said binder is present at about 1 to about 6 weight percent of said anti-fog coating.

11. The polymer film of claim 1, wherein said binder comprises a sulfomonomer.

12. The polymer film of claim 11, wherein said sulfomonomer comprises 5-sulfoisophthalic acid.

13. The polymer film of claim 1, wherein said fluorosurfactant is present at about 0.02 to about 0.5 weight percent of said anti-fog coating.

14. The coated polymer film of claim 1, wherein said surfactant is present at about 0.4 to about 2.0 weight percent of said anti-fog coating.

15. The coated polymer film of claim 1, wherein said surfactant comprises an anionic surfactant.

16. The coated polymer film of claim 1, wherein said surfactant comprises sodium dodecyl benzenesulfonate.

17. The coated polymer film of claim 1, wherein said surfactant includles comprises sodium lauryl sulfate.

18. The coated polymer film of claim 1, wherein said surfactant comprises a sulfosuccinate.

19. The coated polymer film of claim 1, wherein said surfactant comprises sodium 2-ethylhexylsulfate.

20. The polymer film of claim 1, further comprising a slip agent.

21. The polymer film of claim 20, wherein said slip agent comprises at least one silica.

22. The polymer film of claim 20, wherein said slip agent comprises colloidal $SiO_2$.

23. The polymer film of claim 20, wherein said slip agent is present at about 0.25 to about 2 weight percent of said anti-fog coating.

24. The polymer film of claim 20, wherein said slip agent is present at about 0.3 to about 1 weight percent of said anti-fog coating.

25. The polymer film of claim 1, wherein said anti-fog coating has a solids level of about 0.01 to about 30 weight percent.

26. The polymer film of claim 1, wherein said anti-fog coating has a coating thickness of about 0.02 microns to about 0.1 microns.

27. The polymer film of claim 1, wherein said anti-fog coating has a coating thickness of about 0.03 microns to about 0.05 microns.

28. The polymer film of claim 1, wherein said coating has a wetting tension of greater than about 65 dynes/cm.

29. The polymer film of claim 1, wherein said coating has a wetting tension of greater than about 69 dynes/cm.

30. The coated polymer film of claim 1, wherein said anti-fog coating contains no crosslinkers.

31. The coated polymer film of claim 1, wherein said anti-fog coating contains no more than about 0.5 weight percent crosslinker.

32. A process for controlling the formation of fog on a surface, said process comprising:
   a) coating said surface with an anti-fog coating consisting essentially of a water-soluble hydrophilic copolyester binder and a surfactant, wherein said surfactant contains less than about 0.5 weight percent of a fluorosurfactant, and wherein said coating has a wetting tension of greater than about 60 dynes/cm.

33. The process of claim 32, wherein said coating is coated on a polymer film surface.

34. The process of claim 32, wherein said coating of said surface is accomplished by in-line coating.

35. A coated polymer film having a coated surface that resists the formation of fog, said film comprising
   a self-supporting polymer film layer, and
   an anti-fog coating layer on said film layer, said anti-fog coating consisting essentially of a hydrophilic copolyester binder and a surfactant, wherein said surfactant contains less than about 0.5 weight percent of a fluorosurfactant, and wherein said coating is fog-free after 2 seconds exposure to a warm air humidifier at a distance of 3–6 inches.

36. A process for controlling the formation of fog on a surface, said process comprising:
   a) coating said surface with an anti-fog coating layer consisting essentially of a hydrophilic copolyester binder and a surfactant, wherein said surfactant contains less than about 0.5 weight percent of a fluorosurfactant, and wherein said coating is fog-free after 2 seconds exposure to a warm air humidifier at a distance of 3–6 inches.

* * * * *